United States Patent [19]

Kerr et al.

[11] Patent Number: 5,124,185
[45] Date of Patent: Jun. 23, 1992

[54] VACUUM INSULATING UNIT

[75] Inventors: Thomas P. Kerr, Pittsburgh; Shaow B. Lin, Allison Park; Peter P. Harmon, Jeannette; William R. Siskos, Delmont; James L. Oravitz, Jr., Cheswick; Paul E. Shaffer, New Kensington, all of Pa.

[73] Assignee: PPG Industries, Inc., Pittsburgh, Pa.

[21] Appl. No.: 416,572

[22] Filed: Oct. 3, 1989

[51] Int. Cl.⁵ .............................................. E06B 3/24
[52] U.S. Cl. ..................................... 428/34; 428/120; 428/192; 52/788; 52/790
[58] Field of Search ............... 428/34, 119, 120, 192, 428/426, 908.8, 913; 52/788, 790; 156/107, 109

[56] References Cited

U.S. PATENT DOCUMENTS

| 1,370,974 | 3/1921 | Kirlin | 428/34 |
| 2,708,774 | 5/1955 | Seelen | 52/788 |
| 2,768,475 | 10/1956 | Seelen et al. | 52/788 |
| 3,889,434 | 6/1975 | Shelver | 52/172 |
| 3,974,822 | 8/1976 | Patil | 126/271 |
| 3,990,201 | 11/1976 | Falbel | 52/171 |
| 4,204,015 | 5/1980 | Wardlaw | 428/34 |
| 4,312,457 | 1/1982 | Allaire | 220/2.1 R |
| 4,393,105 | 7/1983 | Kreisman | 428/34 |
| 4,423,718 | 1/1984 | Garrison | 126/438 |
| 4,427,430 | 1/1984 | Allaire et al. | 65/41 |
| 4,584,841 | 4/1986 | Guillaume et al. | 62/62 |
| 4,586,289 | 5/1986 | Jaeger | 49/64 |
| 4,683,154 | 7/1987 | Benson et al. | 428/34 |
| 4,786,344 | 11/1988 | Beuther | 156/109 |

FOREIGN PATENT DOCUMENTS

| 861081 | 3/1978 | Belgium. |
| 887511 | 6/1981 | Belgium. |
| 0047725 | 3/1982 | European Pat. Off. ............ 428/34 |
| 2611983 | 9/1977 | Fed. Rep. of Germany. |
| 2823989 | 12/1979 | Fed. Rep. of Germany. |
| 3025683 | 4/1982 | Fed. Rep. of Germany. |
| 3324396 | 11/1984 | Fed. Rep. of Germany. |
| 2305557 | 3/1975 | France. |
| 57-140342 | 2/1981 | Japan. |
| 2520062 | 11/1976 | Netherlands ................. 428/34 |
| 2520062 | 4/1975 | Switzerland. |

OTHER PUBLICATIONS

Laser Sealed Evacuated Window Glazing, Benson et al., oc. 1984.
Patching the Thermal Hole of Windows, Thomas F. Potter, Apr. 1985, Abstract and Pages 1-10.

Primary Examiner—Ellis P. Robinson
Assistant Examiner—Donald J. Loney
Attorney, Agent, or Firm—Donald C. Lepiane

[57] ABSTRACT

A vacuum insulating unit has a pair of glass sheets spaced from one another by a plurality of plastic supports. The supports have one end secured to one of the sheets and a low friction material on the other end. A flexible metal edge retainer is secured to sheets to provide a sealed compartment between the sheets. Air in the compartment is removed to put the compartment under negative pressure. A getter is provided in the compartment to adsorb any gas therein during sealing or using the unit. One of the sheets may have an environmental coating.

Methods are disclosed for fabricating the unit and the supports.

10 Claims, 1 Drawing Sheet

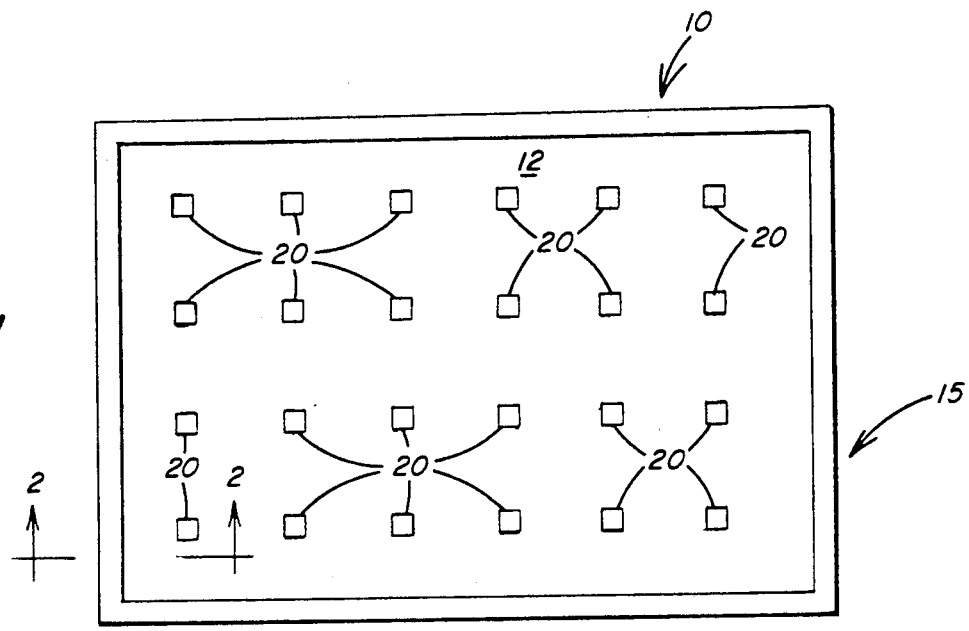
FIG. 1
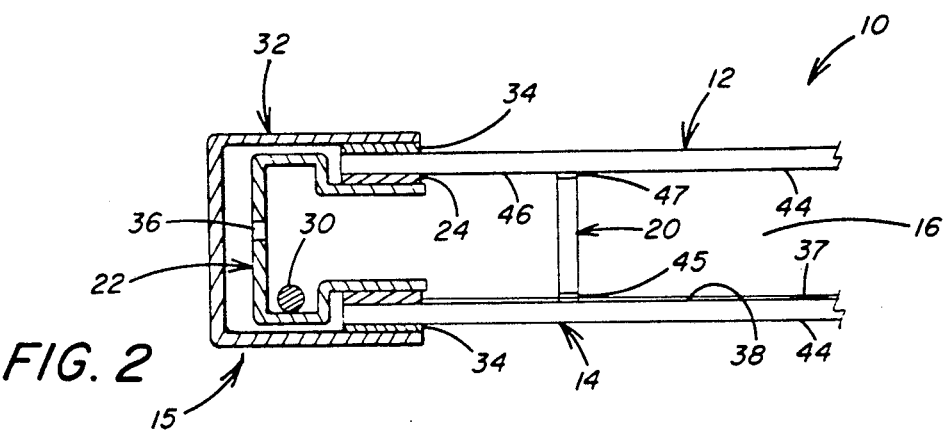
FIG. 2
FIG. 3

VACUUM INSULATING UNIT

FIELD OF THE INVENTION

This invention relates to a vacuum insulating unit and to a method of making same and, in particular, to a vacuum unit having a fluid—, e.g. gas-impervious flexible edge assembly secured to a pair of glass sheets to provide a sealed compartment therebetween which contains a vacuum, and supports engaging major surfaces of the sheets to maintain the sheets in spaced relationship to one another.

BACKGROUND OF THE INVENTION

At the present time multiple glazed units are employed to minimize heat loss from a structure while providing visual access into and out of the structure. The multiple glazed units have evolved through the years and included in that evolution are units having a dead air space between the sheets, units having an insulating gas in the space, units having a vacuum in the space, and units having an environmental coating e.g. low emissivity coatings on the glass sheets. Of particular interest in the discussion are the units that have a vacuum in the space between the sheets e.g. types taught in U.S. Pat. Nos. 3,974,822; 3,990,201; 4,393,105; 4,586,289; 4,683,154 and 4,786,344.

Units having a vacuum in the space are of particular interest because the evacuated space minimizes or nearly eliminates the conduction and convection heat transport. These types of units constructed according to the teachings of the prior art, however, have drawbacks. More particularly, the vacuum between the glass sheets causes the sheets to bow or deflect toward one another; the excess bowing can result in the sheets fracturing or contacting one another. When the sheets contact one another a heat conduction path is established through the unit by direct conduction, thereby reducing the thermal efficiency of the unit. Another concern is providing an edge seal that maintains the vacuum in the space between the sheets.

U.S. Pat. No. 4,393,105 teaches a unit that has the space between the sheets filled with a low heat-loss gas or left under vacuum. The patent does not positively teach a technique to keep the glass sheets from contacting one another. Further, the patent implicitly teaches a rigid frame to space the sheets. A drawback with a rigid frame is that it does not accommodate sheet movement and may result in seal fracture.

U.S. Pat. No. 3,974,822 teaches the use of spacers made of cork or plastic to maintain the sheets apart; however, there are no teachings therein to provide an edge seal that maintains the vacuum in the air space for an acceptable period of time. U.S. Pat. No. 4,586,289 teaches a vacuum insulating window and reflector for controlling the heat gain and loss of a structure. Although the unit provides for separators to keep the sheets apart, the edge seal of the unit is merely referred to as a sealant material in the space between the glass sheets and the outer channel. The channel appears to be rigid and therefore cannot accommodate movement of the glass sheets due to thermal differences. The result is that the edge seal will fracture allowing air into the space between the sheets.

U.S. Pat. No. 3,990,201 teaches a vacuum unit having a pair of glass sheets separated by insulating spacers and an O ring between the sheets. The sheets are mounted in a U-shaped channel and have mica spacers therebetween. The unit is not a sealed unit, but uses an O-ring to provide a seal. There are no provisions for preventing marring of the sheets as they move relative to one another over the spacers.

U.S. Pat. Nos. 4,683,154 and 4,786,344 each teach a vacuum unit having spacers between the sheets and the edges sealed to a glass filament or the edges of the sheets sealed together. These types of edge seals do not provide for expansion of the units that may occur due to thermal difference of the sheets.

From the above, it is clear that a vacuum unit that does not have the limitation or drawback of the vacuum units taught in the prior art is desirable.

DESCRIPTION OF THE DRAWING

FIG. 1 is a plan view of a vacuum insulating unit incorporating features of the invention.

FIG. 2 is a view taken along lines 2—2 of FIG. 1.

FIG. 3 is a view, similar to the view in FIG. 2, illustrating an alternate embodiment of the edge assembly of the invention.

SUMMARY OF THE INVENTION

This invention relates to vacuum insulating unit having a pair of sheets made of a fluid—e.g. gas-impervious material e.g. glass sheets, a flexible, fluid—e.g. gas-impervious edge assembly to secure the sheets together to provide a fluid—e.g. gas-impervious compartment therebetween, and facilities e.g. supports in the compartment to prevent the surfaces of the sheets from contacting one another. The compartment has a negative pressure as compared to the external pressure acting on the unit, i.e. a vacuum.

This invention further relates to a method of fabricating the vacuum insulating unit discussed above and includes, among other things, the steps of providing the pair of glass sheets, securing the edge assembly to the glass sheets to provide the gas-impervious compartment therebetween, and thereafter providing a vacuum in the compartment, while preventing the sheets from contacting one another. In an embodiment of the invention, supports to prevent the sheets from contacting one another are positioned between the sheets prior to securing the edge assembly to the sheets.

This invention also relates to supports of laminated layers of reinforced fibers impregnated with a thermoset or thermoplastic resin, e.g. bismaleimide or polyamidimide.

This invention still further relates to a method of making the supports and includes the steps of stacking sheets of resin impregnated fibers to form a panel, curing the panel, and cutting the panel into supports.

The invention is not limited to the fluid—e.g. gas-impervious value of the sheets and/or the edge assembly; however, materials selected are recommended to have values such that after the unit is assembled, an absolute pressure of less than $10^{-5}$ torr is provided in the compartment for a period of more than 24 hours. Units constructed in accordance to the invention are expected to retain the vacuum in the compartment for at least 10 years and up to 20 years.

DESCRIPTION OF THE INVENTION

Referring to the drawing there is shown insulating unit 10 (FIGS. 1 and 2) and 11 (FIG. 3) incorporating features of the invention. In the following discussion of the invention, unless indicated to the contrary, like numbers refer to like elements.

The unit 10 shown in FIGS. 1 and 2 includes sheets 12 and 14 made of a fluid—e.g. gas-impervious material secured together and spaced from one another by a flexible fluid—e.g. gas-impervious edge assembly 15 to provide a compartment 16 (see FIG. 2) therebetween. The compartment 16 has a vacuum, i.e. a pressure less than the outside pressure acting on the unit and has supports 20 to prevent the sheets 12 and 14 from bowing, or to minimize the bowing of the sheets to keep the sheets from contacting one another due to the external positive pressure acting on the unit.

The sheets 12 and 14 and the edge assembly 15 provide a fluid e.g. gas barrier to seal the compartment 16 from the environment to, among other things, prevent the atmosphere outside the unit from moving into the compartment thereby maintaining a pressure in the compartment less than the pressure acting on the unit when in use i.e. maintains a vacuum in the compartment 16.

The sheets 12 and 14 may be made of any fluid-impervious material that has structural stability, e.g. glass, metal and/or a fluid pervious substrate having a fluid-impervious material or film on its surfaces.

The term "fluid-impervious material" as used herein means a material that resists the flow of a fluid e.g. moisture or gas therethrough. As will be appreciated the units 10 and 11 are constructed of a plurality of components made of materials that resist the flow of fluids therethrough; however, the invention is not limited to components having a specific minimum fluid-impervious value. The invention is directed to components that when assembled provide a unit that has a sealed compartment in which a vacuum level measured in absolute pressure can be maintained for a predetermined period of time. Although in the practice of the invention, the components of the unit are selected to resist the flow of gases that are constituents having the proportions normally present in air, the invention is not limited thereto and contemplates the use of components to resist the flow of any gas to maintain an absolute pressure in the compartment for a specified time period. This feature of the invention is discussed in more detail below.

The sheets 12 and 14, further, should have sufficient structural stability either alone or in combination with the supports 20 to prevent the sheets from contacting one another thereby preventing the establishment of a thermal path through the unit. Maintaining the sheets spaced from one another provides the units 10 and 11 with thermal insulating properties. Although not limiting to the invention, in the following discussion the sheets 12 and 14 are glass sheets.

The size and thickness of the glass sheets 12 and 14 are not limiting to the invention; however, the following should be considered when selecting glass sheets. It has been shown that glass sheets 10 inches (2.54 centimeters) square and $\frac{1}{2}$ inch (1.27 centimeters) thick separated by an edge retainer made of $\frac{1}{8}$ inch (0.32 centimeter) thick plastic frame placed inside a silicone rubber O ring positioned at marginal edges of the sheets bowed, but the sheets did not contact one another when a vacuum of $10^{-5}$ torr was pulled in the compartment between the sheets. It is expected that increasing the peripheral dimensions of the sheets while maintaining the sheet thickness and vacuum level constant, would increase the degree of bowing of the sheets, i.e. decrease the distance between the sheets, and visa versa. Further, it is also expected that decreasing the sheet thickness while maintaining the peripheral dimensions of the sheets and the vacuum level in the space between the sheets constant would increase the degree of bowing and visa versa.

The degree of bowing of the sheets may be minimized by using substantially rigid glass sheets, as discussed above, using sheets having a convex surface i.e. the sheets bow outwardly, or using supports between the sheets e.g. similar to the supports 20 shown in the drawing. In the practice of the invention it is preferred, but not limited to, the use of the supports 20 to reduce the degree of sheet bowing because using supports permits the peripheral dimensions of the sheets to increase and their thickness to decrease while minimizing sheet bowing. This results in reduced overall weight of the unit when compared to a unit made of substantially thicker rigid sheets.

Because the compartment 16 will be under a negative pressure, it is recommended that pre-stressed e.g. heat strengthened or tempered glass sheets be used to eliminate the propensity of sheet breakage. The sheets may be pre-stressed in any convenient manner e.g. as taught in U.S. Pat. No. 3,174,839, which teachings are hereby incorporated by reference.

The glass sheets 12 and 14 may be clear, tinted, coated or any combination thereof. For example, one of the sheets may have an environmental coating such as the types disclosed in U.S. Pat. Nos. 2,566,346; 3,447,936; 3,660,061; 4,594,137; 4,692,389; 4,610,771 or in U.S. patent application Ser. No. 176,511 filed Apr. 1, 1988, in the name of James Finley and entitled "Low Emissivity Film For High Temperature Processing" which teachings are incorporated by reference. As will be discussed in detail below, during the assembly of the unit 10, the sheets will be exposed to elevated temperatures; therefore, the coating selected should be capable of withstanding elevated temperatures without deterioration thereof. Coatings that may be used, but not limited thereto, are those taught in the above mentioned U.S. Pat. Nos. 3,660,061 and 4,610,771 and in the U.S. patent application.

Referring back to FIGS. 1 and 2 and as previously mentioned, the glass sheets 12 and 14 are maintained in spaced relation by the supports 20. The shape, size, number, and the properties and composition of the material of the supports is not limiting to the invention; however, in identifying supports for use in the practice of the invention, the following should be considered.

The shape of the supports 20 is preferably selected to minimize stresses in the glass caused by the support contacting the glass. It has been concluded that supports made of materials that have high elastic modulus e.g. glass, steels or aluminum establish high stresses near the interface in the glass sheets and are not preferred in the practice of the invention. More particularly, use of materials that have a high elastic modulus require precision machining of a contact surface and height for uniform load sharing and minimal contact stresses. Supports having some degree of compressibility i.e. relatively low elastic modulus are preferably used in the practice of the invention. Further supports having a planar supporting surface e.g. but not limited to columns having circular, parallelepiped or triangular cross sections are recommended because there are minimal and uniform contact stresses at the sheet-support interface. It is further preferred in the practice of the invention to employ supports that have a circular cross section because their shear flexibility is not preferential with respect to direction, and stress concentration at the corner is absent when the sheets and supports move relative to one another as a result of temperature differences between the sheets 12 and 14 and/or the edge assembly 15.

The size, strength and number of the supports should be selected to support the load transmitted through the sheets to prevent the sheets from contacting one another while having minimal contribution to increasing thermal conduction through the unit and minimal reduction in the viewing area of the unit. As can be appreciated increasing the number of supports minimizes the degree of bowing of the sheets; however, too many supports can establish paths of thermal conduction through the unit thereby reducing its insulating value and can also obstruct viewing through the unit. Increasing the size of the supports while maintaining the other characteristics of the supports constant decreases the required number of supports; however, increasing the size makes the supports more noticeable. Increasing the load carrying capacity of the supports reduces the number of supports required to prevent the sheets from contacting one another and increases the viewing area of the unit. As can be appreciated visual observation of the supports is a subjective test and is not limiting to the invention; however, the size and number of support used to prevent the sheets from contacting one another should be such as to provide maximum viewing and minimum sheet bowing.

The material composition for the supports is selected to permit minimal thermal conduction through the sheets, to have minimal if any outgassing products for reasons which are discussed in more detail below and to have structural stability. By way of illustration, plastic spacers are preferred over metal spacers because plastic materials are generally lower heat conductors. Another mechanical property to be considered in selecting materials for supports is elastic strain. Supports made by materials that elastically deform to adjust to the glass surface when under compression are preferred.

As previously mentioned the glass sheets may move relative to one another due to thermal differences of the sheets. When this occurs, the relative spaced distance between the supports may change during such sheet movement. Although the invention covers adhering both ends of the supports to the surfaces of the glass sheets facing the compartment, excessive movement of the glass sheets may result in shearing of the supports and/or marring of the glass surfaces. Therefore, the preferred embodiment is to adhere one surface of the support to a glass sheet and provide a material having a low coefficient of friction on the other end. Materials that are preferred are those that have a low coefficient of friction in vacuum, for example, but not limiting to the invention, molybdenum disulfide and materials sold under the trademark Teflon.

Supports that may be used in the practice of the invention may be made by impregnating a thermosetting material e.g. bismaleimide, epoxy, cyanate etherimide, or combinations thereof or a thermoplastic material e.g. polyamidimide into a fabric or mesh screen e.g. fiberglass tape, coverings or fabrics and laminating the fabrics to obtain the desired height for the supports. An adhesive may be provided at one end of the support to prevent movement of the support and a low friction material at the other end e.g. Teflon ® powder, molybdenum disulfide powder or vacuum sputtered molybdenum disulfide. Materials such as carbon black may also be used for colorization, UV stability and resin or matrix strength.

With reference to FIG. 2, the flexible edge assembly 15 includes a fluid—, e.g. gas-impervious edge retainer 22 adhered to the glass sheets by a fluid—, e.g. gas-impervious sealant adhesive 24 to prevent the atmosphere from moving into the compartment 16. The edge assembly 15 is preferably flexible to allow the glass sheets to move relative to one another due to thermal differences of the sheets and/or the edge assembly. To minimize stress due to expansion mismatch, but not limiting to the invention, it is recommended that the materials of the sheets, edge retainer and sealant adhesive have similar coefficients of expansion. Further, the edge retainer should be made so that it can flex to accommodate thermal differences between the sheets. In FIG. 2 the edge retainer 22 is shown to have a hair pin cross section, and in FIG. 3 edge retainer 26 of flexible fluid—, e.g. gas-impervious edge assembly 28 has a C-shaped cross section.

The edge retainer 22 is preferably made of metal; however, other fluid-impervious materials or fluid-pervious materials having fluid-impervious coating or film over the surfaces may be used in the practice of the invention.

Any type of fluid-impervious sealant adhesive 24 may be used to secure the edge retainer 22 to the glass sheets. For example and not limiting to the invention, a metal edge retainer may be secured to the marginal edges of the glass sheets by a sealant adhesive of the type sold by Ferro Corporation as EJ-179.

In those instances where the sealant adhesive is a frit and is used with a metal edge retainer, the surface of the edge retainer should be prepared to improve adhesion between the frit and edge retainer. Aluminum doped metals are easily oxidized whereas metals that do not readily form an oxide layer on its surface may require special process to oxidize the surface. For example, an edge retainer made of an alloy having 53% iron and 47% nickel used with Ferro's EJ-179 sealant adhesive is oxidized by heating the edge retainer to a temperature of about 1700° F. (927° C.) in a $CO_2$ steam atmosphere for a period of about 65 minutes. The atmosphere during heat up was a forming gas and on cool down was nitrogen.

In instances where the sealant adhesive has to be heat set or heat activated, the surfaces of the components of the unit e.g. the supports 20 will outgas; further surface outgassing of the components may occur during use of the units 10 and 11. To adsorb the outgassed products, it is recommended that a getter 30 such as the type sold by SAES Getters # ST707 be in communication with the compartment.

With continued reference to FIG. 2, a protective cover 32 is secured around the perimeter of the unit 10. The cover 32 is made of a plastic material e.g. polyvinyl chloride and is adhered to the outer marginal edge of the unit 10 in any convenient manner, e.g. by a hot melt adhesive layer 34.

Vacuum may be pulled in the compartment 16 through a hole 36 in the retainer 22 or 26 or a hole (not shown) in one of the glass sheets. After the vacuum is pulled the hole is sealed in any convenient manner.

In those instances where the setting or activating temperature of the sealant adhesive 24 is higher than the decomposition temperature of the supports 20 and lower than the melting temperature of the sheets, the sealant adhesive 24 may be set to join the edge retainer and the sheets together by preferential heating e.g. heating with a laser or passing current through the metal edge retainer. In those instances where the setting temperature of the sealant adhesive is lower than the temperature at which the sheets and supports lose their structural integrity, the components of the unit may be assembled and heated in an oven at a temperature above the setting temperature of the sealant adhesive and below the temperature at which the supports or any other component of the unit lose their structural integrity.

In the discussion of the glass sheets 12 and 14 and edge assemblies 15 and 28, the term fluid- or gas-impervious was used to describe a characteristic of the material. The sealed compartment 16 defined by the glass sheets and the edge retainer 22 or 26 has a negative pressure in relationship to the pressure outside the compartment i.e. a vacuum is provided in the compartment 16. To maintain the compartment under negative pressure is a function of the fluid-impervious properties of the sheet and edge assembly; therefore, each component of the edge assembly, and the sheets are selected to cooperate with one another to prevent a fluid such as air from penetrating into the compartment. For example, increasing the thickness of a sealant adhesive layer having a higher gas permeability than the glass sheets and metal edge retainer will prevent air from moving into the compartment better than a thicker layer of the same adhesive. Therefore, as used herein the terms "fluid impervious" or "gas impervious" are descriptive of the components acting together after they have been assembled to form the unit 10 or 11. In the practice of the invention, a unit capable of maintaining an absolute pressure in the compartment of less than 1.0 torr for 24 hours is for purposes of the invention made of components having adequate fluid- or gas-impervious values; units capable of maintaining an absolute pressure in the compartment of less than $10^{-4}$ torr for 24 hours is for purposes of the invention made of components having acceptable fluid- or gas-impervious values, and units capable of maintaining a vacuum of less than about $10^{-6}$ torr for 24 hours is considered to be made of components having optimum fluid- or gas-impervious values. In each of the forgoing the spacing between the sheet surfaces facing the compartment is about 0.020 inch (0.0508 centimeter). Although the time period is 24 hours it is expected that units made in accordance to the practice of the invention can fabricate units retaining the vacuum in the compartment for at least 10 years with an expected period of up to 20 years.

The pressure in the compartment may be measured in any convenient manner. For example but not limiting to the invention, the unit under test is placed in an evacuated chamber having a known absolute pressure. The edge assembly or the sheet has a hole drilled and the absolute pressure value in the chamber observed. In those instances when the atmosphere in the compartment of the unit moves into the chamber, i.e. the pressure in the compartment is greater than the pressure in the chamber the absolute pressure in the chamber increases. In those instances when the atmosphere in the chamber moves into the compartment, i.e. the pressure in the chamber is less than the pressure in the chamber, the absolute pressure in the chamber decreases.

As can now be appreciated by those skilled in the art other tests may be used to determine the absolute pressure in the compartment.

DETAILED DESCRIPTION OF THE INVENTION

Although prototypes of the invention have been made to evaluate the various components of the unit, in the following discussion, units are constructed based on the knowledge obtained from evaluating the prototypes.

The units 10 and 11 shown in FIGS. 1-3 may be constructed in the following manner. Glass sheets 12 and 14 each having dimensions of 20 inches (50.8 centimeters)×14 inches (35.56 centimeters)×0.09 inch (0.23 centimeter) are thermally tempered and thereafter a low emissivity heatable coating 37 is either sputtered or pyrolytically applied to one surface of a sheet e.g. surface 38 of the sheet 14.

In the first example, the unit shown in FIG. 3 will be constructed. The supports 20 used in the example have a decomposition temperature less than, and the glass sheets have a decomposition temperature higher than, the setting temperature of the sealant adhesive 24 of the edge assembly 28.

The C-shaped edge retainer 26 made of an iron-nickel-aluminum alloy and having a thickness of 0.003 inch (0.00762 centimeters) is cut into two sections each having an "L" shaped cross section. The sections are oxidized. Since the alloy has aluminum, any convenient oxidizing technique may be used. The L-shaped sections are welded at their ends to provide a fluid impervious frame section. Ferro Corporation frit EJ-179 324 is extruded onto the marginal edges of outer surface 42 of the glass sheet 12 and uncoated or outer surface 44 of the glass sheet 14. One frame section is mounted on the adhesive layer 24 on the outer marginal edges of the sheet surface 42, and the other frame section mounted on the adhesive layer 24 on the glass sheet surface 44. The subassemblies are heated to about 800° F. (427° C.) to set the adhesive layer 24 and secure the frame sections to their respective sheets.

A bismaleimide support 20 is prepared as follows. Bismaleimide and carbon black are impregnated into a fiberglass woven fabric to produce prepregs having a thickness of about 0.004 inch (0.0102 centimeter). "Prepregs" as used herein means a substrate e.g. fabric or mesh impregnated primarily with a thermoplastic or thermosetting resin. The prepregs are layed in alternating directions to minimize internal stress and layed to a thickness sufficient to provide a thickness of 0.020 inch (0.0508 centimeter) after the layered prepregs are cured. A film made of a Teflon ® powder dispersed into a bismaleimide film is positioned on top of the layed-up prepregs. The layed-up prepregs are placed in an autoclave and heated to a temperature of about 350° F. (176° C.) for about six hours at a pressure of 85 psi to cure and laminate the layed-up prepregs to form a panel of a thickness of about 0.020 inch (0.0508 centimeter). The panel is then post-cured in an oven at a temperature of about 450° F. (232° C.) for six hours. An adhesive 47 is applied to the panel surface opposite to the surface having the Teflon ® powder. The surface of the panel having the adhesive is placed on a low-tack adhesive tape, and the panel diced into cubes have a side length of about 0.020 inch (0.0508 centimeter). The cubic shaped supports are removed from the tape, and the surface having the adhesive adhered to a glass sheet.

The spacers are secured to inner surface 46 of the glass sheet 12 by the adhesive 47. The spacers 20 are on a center to center spacing of about 0.725 inch. (1.84 centimeter). The upper and lower glass sheets are brought together about the supports and the frame sections are welded together in any convenient manner. The hole 36 is provided in the edge retainer 26, and the unit is heated in an oven to a temperature of about 600° F. (315° C.) to outgas the components e.g. supports of the unit. As the unit is heated, a vacuum is pulled through the hole to provide a vacuum level of $10^{-5}$ torr in the compartment 16 as an activated getter 30 of the type sold by SAES Getters is moved through the hole 36 into the compartment 16. After an absolute pressure level of about $10^{-5}$ torr is reached, the hole 36 is conveniently sealed e.g. welded shut. Thereafter the unit 10 is further heated for one hour at a temperature of 400° F. (204° C.) to further outgas the components. The outgassing product is adsorbed by the getter 30.

In the second example the construction of the unit 10 shown in FIG. 2 will be discussed. In this example, the adhesive layer 34 has a setting temperature lower than the decomposition temperature of the supports 20, i.e. lower than 600° F. (315° C.) and the glass sheets.

After the glass sheet surface 38 is coated and the supports 20 secured to the glass sheet surface 46 by the adhesive layer 47, the layer of sealant adhesive 24 is applied to the inner marginal edges of the glass sheets 12 and 14 as viewed in FIG. 2. Sections of the edge retainer 22 having the hairpin cross section have their ends welded to form a gas-impervious frame and thereafter the frame is oxidized. A layer of the sealant adhesive is also applied to the outer surface of the frame and the frame ends positioned between the sheets while the sheets are clamped together about the supports. The assembly is heated to a temperature below the decomposition temperature of the supports e.g. below 600° F. (325° C.) and above the setting temperature of the adhesive sealant to set the adhesive sealant and outgas the components. After sealing, the temperature is dropped to 400° F. (204° C.), a vacuum level of $10^{-5}$ torr is pulled through the hole 36 in the frame; the activated getter 30 is inserted through the hole 42 into the compartment 16, and the hole sealed. The unit is further heated at 400° F. (204° C.) for about one (1) hour to further or completely outgas the components.

After the unit has cooled, the protective cover 32 is positioned around the marginal edges of the unit and secured to the outer marginal edges of the glass sheets 12 and 14 as viewed in FIG. 2 by the hot melt adhesive layer 34.

In the third example a unit of the type shown in FIG. 3 is constructed using the adhesive layer 34 having a setting temperature lower than the decomposition temperature of the supports 20, i.e. lower than 600° F. (315° C.) and the glass sheets.

The procedure discussed in the second example is practiced except the edge retainer 26 instead of the edge retainer 22 is used. After the supports are positioned between the glass sheets a pair of U-shaped sections each having a "C" shaped cross section is positioned over the marginal edges of the glass sheets having the spacers therebetween. The ends of the U-shaped sections are joined together e.g. by welding, and an adhesive is extruded between the edge retainer and the glass sheets to provide the adhesive layer 24 as shown in FIG. 3.

The assembly is then heated as discussed in the second unit to provide the vacuum insulating unit of the invention.

Units constructed in accordance with the above teachings are expected to maintain an absolute pressure level of about $10^{-5}$ torr for about 20 years. The R value is between 6-10 in dimensions of hour-feet squared-°F. per BTU.

As can now be appreciated the invention is not limited to any of the preceding discussions nor to the embodiments and examples which are presented for illustration purposes only.

What is claimed is:

1. An insulating unit comprising:
   a pair of glass sheets each having a major surface;
   a flexible fluid-impervious edge retention assembly secured to marginal edges of said glass sheets to position the major surfaces of said sheets in facing relationship and to provide a fluid-impervious compartment therebetween;
   a plurality of supports positioned in said compartment, one surface of said supports secured on the major surface of one of said sheets defined as a first sheet and a low friction material on the other surface of said support which contacts the major surface of the other sheet defined as the second sheet to minimize friction acting on the major surface of the second sheet such that the sheets are slideable relative to one another; and
   said compartment having a negative pressure when compared to the pressure outside said compartment.

2. The unit as set forth in claim 1 further including a getter communicating with said compartment.

3. The unit as in claim 2 wherein
   said major surface of said second sheet has an environmental coating on its major surface facing the compartment and said major surface of said first sheet facing the compartment is uncoated;
   said one surface of said supports is secured to said major surface of said first sheet.

4. The unit as set forth in claim 3 wherein said edge assembly includes a metal edge retainer secured to inner marginal edges of the sheets by a fluid-impervious sealant adhesive.

5. The unit as set forth in claim 3 wherein said edge assembly includes a metal edge retainer secured to the outer marginal edges of the sheets by a fluid-impervious sealant adhesive.

6. The unit as set forth in claim 3 wherein said edge retention assembly includes a metal edge retainer secured to the edges of the sheets by a thermal setting inorganic adhesive.

7. The unit as set forth in claim 3 wherein said edge retention assembly includes a metal edge retainer secured to the edges of the sheets by a thermal setting organic adhesive.

8. The unit as set forth in claim 3 wherein said negative pressure in said compartment is equal to or less than about $10^{-3}$ torr for a compartment spacing of about 0.020 inch (0.0508 centimeter) and said negative pressure is maintained in said compartment for at least about 24 hours.

9. The unit as set forth in claim 3 wherein said edge retention assembly includes a cover over said edge retainer.

10. The unit as set forth in claim 3 wherein said fluid-impervious material, said fluid-impervious edge retention assembly and said fluid-impervious compartment are gas-impervious material, gas-impervious edge retention assembly and gas-impervious compartment, respectively.

* * * * *